(12) United States Patent
Chu et al.

(10) Patent No.: US 8,908,862 B2
(45) Date of Patent: Dec. 9, 2014

(54) METHOD, SYSTEM, AND DEVICES FOR FAST SESSION TRANSFER OF WIRELESS DEVICES FROM ONE FREQUENCY BAND TO ANOTHER

(75) Inventors: Liwen Chu, San Ramon, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 159 days.

(21) Appl. No.: 13/448,260

(22) Filed: Apr. 16, 2012

(65) Prior Publication Data
US 2013/0266136 A1     Oct. 10, 2013

Related U.S. Application Data

(63) Continuation-in-part of application No. 13/440,982, filed on Apr. 5, 2012, now abandoned.

(51) Int. Cl.
*H04L 9/00* (2006.01)
(52) U.S. Cl.
USPC ............................................................ 380/44
(58) Field of Classification Search
None
See application file for complete search history.

(56) References Cited

U.S. PATENT DOCUMENTS

| | | | |
|---|---|---|---|
| 7,961,693 B2 | 6/2011 | Chu et al. | |
| 2011/0070842 A1 | 3/2011 | Kwon et al. | |
| 2011/0228755 A1 | 9/2011 | Seok | |
| 2011/0261755 A1 | 10/2011 | Cordeiro et al. | |
| 2012/0327851 A1* | 12/2012 | Wentink et al. | 370/328 |
| 2013/0051353 A1* | 2/2013 | Kim et al. | 370/329 |

* cited by examiner

*Primary Examiner* — Pramila Parthasarathy
(74) *Attorney, Agent, or Firm* — Seed IP Law Group PLLC (57) ABSTRACT

Embodiments are directed to switching of stations STA, access points APs and PCPs that are communicating through a wireless link from one frequency band to another. One embodiment is directed to switching of stations STA that are communicating through a tunneled direct link setup (TDLS) link from one frequency band to another. A multiband element may be added to a TDLS discovery request and TDLS discovery response frames to allow each of the stations communications through a TDLS to determine if the other station has multiband capability. In one embodiment, a pairwise transient key (PTK) is created for both a current band in which the stations STA are communicating and a new band over which the stations may communicate in the future. In this way there is no need to calculate a new pairwise transient key PTK for the new frequency band.

23 Claims, 4 Drawing Sheets

METHOD, SYSTEM, AND DEVICES FOR FAST SESSION TRANSFER OF WIRELESS DEVICES FROM ONE FREQUENCY BAND TO ANOTHER

Priority Data

The present application is a continuation in part of commonly owned U.S. patent application Ser. No. 13/440982, filed Apr. 05, 2012 now abandoned; this application is incorporated herein by reference in its entirety.

TECHNICAL FIELD

The disclosed embodiments relate generally to wireless communications networks, and more specifically to the transfer of operation of wireless devices between different frequency bands in a wireless communications network.

BACKGROUND

IEEE 802.11 is a set of standards for implementing wireless local area networks (WLANs) and has become synonymous with the term "Wi-Fi." In WLANs, wireless devices or stations STA commonly communicate over different frequency bands, where the term station STA can be any of a variety of different types of device, such as a personal computer, netbook computer, tablet computer, cellular telephone, mobile personal device, and so on. A WLAN may include, for example, stations STA and access points (APs) that operate in the 2.4 GHz frequency band, 5 GHz frequency band, 60 GHz frequency (in the relatively new IEEE 802.11ad standard that is also referred to as "WiGig"), as well as other types of stations such as Bluetooth devices. A personal basic service set control point (PCP) may also be part of a WLAN in the 60 GHz band. A personal basic service set (PBSS) is a self-contained network in which access to a distribution system (DS) is not present but an intra-PBSS forwarding service is optionally present. In a PBSS with an intra-PBSS forwarding service available, one of the stations STA, namely the PCP, functions to provide this forwarding service as well as other functionality analogous to the functionality of an AP in a basic service set (BSS) WLAN, as will be understood by those skilled in the art. The BSS and PBSS are WLAN topologies are discussed in more detail below. The 2.4 and 5 GHz bands are sometimes collectively referred to as the "OBand" and the 60 GHz band referred to as the "DBand," and this terminology may be used when referring to such frequency bands in the following description. More efficient methods of switching the operation of stations STA, APs and PCPs among the available frequency bands are needed.

SUMMARY

Embodiments of the present invention are directed to switching of stations STA, APs and PCPs that are communicating through a wireless link from one frequency band to another. Embodiments of the present invention are also directed to switching of stations STA that are communicating through a tunneled direct link setup (TDLS) link from one frequency band to another. In one embodiment, new band operation, as defined by, e.g., an enhanced distributed channel access (EDCA) Parameter for quality of service (QoS) operation, a high throughput (HT) Operation element for HT operation, and a very-high throughput (VHT) Operation element for VHT operation, are added to an FST switch message (e.g., FST Setup Request, FST Setup Response). In one embodiment a multiband element is added to Probe Requests and Probe Responses to allow two stations STA or a station and an access point AP/PCP to determine if the other station has multiband capability, with multiband capability being the ability to communicate over multiple frequency bands. In one embodiment a multiband element is added to TDLS discovery request and TDLS discovery response frames to allow each of the stations communications through a TDLS to determine if the other station has multiband capability. In one embodiment, a pairwise transient key (PTK) is created for a new band over which the stations may communicate in the future when a TDLS Peer Key (TPK) is created for a TDLS direct link for the current band. In this way, when the two stations STA switch from communicating over a TDLS link in the current frequency band to a link in the new frequency band there is no need to calculate a new pairwise transient key PTK for the new frequency band. In one embodiment, when two STAs that communicate with each other through AP forwarding want to switch to a new band, FST Setup frames in the current band are encapsulated in data frames.

DETAILED DESCRIPTION

Embodiments of the present invention are directed to the switching of stations STA, APs and PCPs that are communicating from one frequency band to another. Embodiments of the present invention are also directed to the switching of stations STA that are communicating through a tunneled direct link setup (TDLS) link from one frequency band to another. In one embodiment, new band operation as defined by, e.g., an EDCA Parameter for QoS operation, a HT Operation element for HT operation, and a VHT Operation element for VHT operation, are added to FST Setup frames (e.g. FST Setup Request, FST Setup Response). In another embodiment a multiband element is added to Probe Requests and Probe Responses to allow two stations STA or a station and an access point AP to determine if the other station has multiband capability, with multiband capability being the ability to communicate over multiple frequency bands. In yet another embodiment a multiband element is added to TDLS discovery request and TDLS discovery response frames to allow each of the stations communications through a TDLS to determine if the other station has multiband capability (i.e., multiband capability is the ability to communicate over multiple frequency bands). In one embodiment, a pairwise transient key (PTK) is created for a new band over which the stations may communicate in the future when a TDLS Peer Key (TPK) is created for a TDLS direct link for the current band. In this way, when the two stations STA switch from communicating over a TDLS link in the current frequency band to a link in the new frequency band there is no need to calculate a new pairwise transient key PTK for the new frequency band. In another embodiment, when two STAs that communicate with each other through AP forwarding want to switch to a new band, FST Setup frames in the current band are encapsulated in data frames. These embodiments will be discussed in more detail below.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. The operation of well-known components and/or processes has not been shown or described in detail below to avoid unnecessarily obscuring the present invention. Furthermore, elements shown in the figures are not necessarily drawn to scale and dimensions of some of the elements may be exaggerated in relation to other elements to improve clarity of the figure. Finally, reference descriptors for components discussed herein may be repeated in multiple figures to indicate corresponding identical or similar components between or among the figures. Also, when an alphanumeric reference descriptor is associated with multiple components, the full alphanumeric reference descriptor will be used when referring to a particular one of the components while the numeric portion may be omitted when referring generally to all such components.

Figure 1:
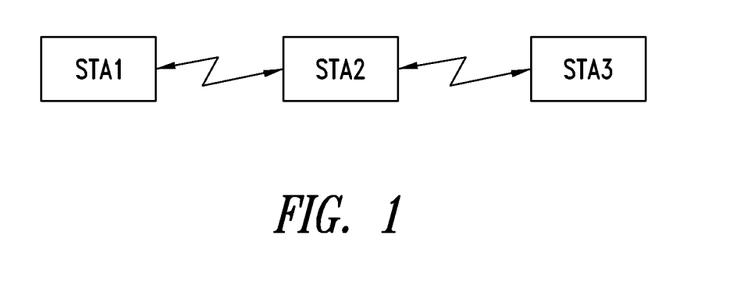
FIG. 1 is a functional block diagram of a WLAN having an independent basic service set (IBSS) topology.

FIG. 1 shows three stations STA1, STA2, and STA3 forming a simplified WLAN 100. The WLAN 100 has the topology referred to as an independent basis service set (IBSS) in which the WLAN includes only stations STA. In the IBSS topology, each of the stations STA1-3 communicates with another desired station by directly linking to that station, as will be appreciated by those skilled in the art. The IBSS topology includes no access point AP that interconnects the WLAN 100 to a distribution system (DS), such as a wired "backbone" network like an Ethernet network through which the WLAN can connect to other networks like the Internet. A WLAN including an access point AP has what is termed the basic service set (BSS) topology, as will be discussed in more detail below with reference to FIG. 2. Also note that the WLAN 100 could alternatively have the personal BSS (PBSS) topology previously discussed if the WLAN operates in the DBand frequency range and one of the stations STA functions as a PCP (i.e., a PBSS control point). In a PBSS network the PCP performs an intra-PBSS forwarding function analogous to an access point AP, as well as performing other access point like functions like beacon transmission, as will be appreciated by those skilled in the art.

Figure 2:
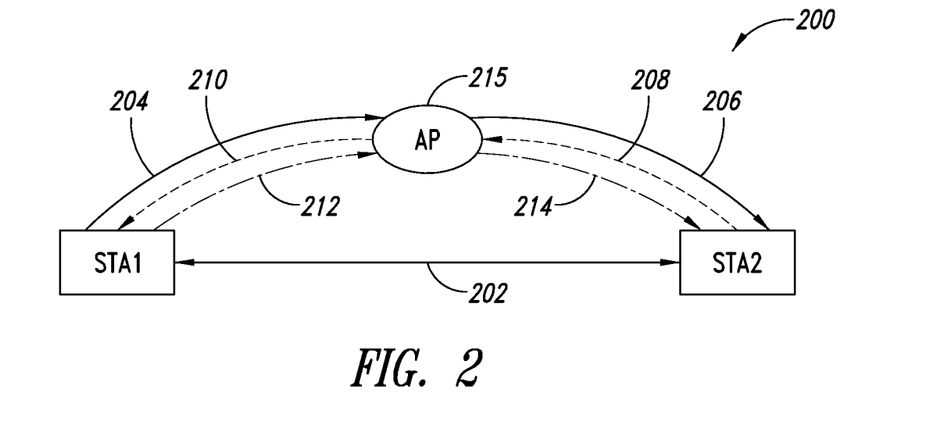
FIG. 2 is a functional block diagram of a WLAN having a basic service set (BSS) topology and illustrating the establishment of a TDLS direct link between two stations of the WLAN.

FIG. 2 shows a WLAN 200 having the BSS topology in which the WLAN includes an access point AP that functions to handle communications between stations STA through the access point, and that also allows the stations to connect to other networks (not shown) via the access point. The BSS topology of the WLAN is the typical topology for a home wireless network, where the access point AP corresponds to a wireless router that allows the stations STA1 and STA2 to communicate over another network such as the Internet and also allows the stations to communicate with one another. The stations STA1, STA2 are typically personal computers, tablet computers, mobile devices like cellular phones, gaming consoles, televisions, and so on. It should be noted that although conventional IEEE 802.11 terminology uses the term "station" STA generally to include both access point AP and non-AP type devices (e.g., personal computers, mobile phones, and so on), the term station STA is used to indicate a non-AP type device while the term access point AP is used to indicate an access point AP device.

In addition to communicating with each other via the access point AP, the BSS topology also allows stations STA to directly connect or link to other stations through what is known as tunneled direct link setup (TDLS). This is illustrated through the lines and dotted lines in FIG. 2. In the example shown in FIG. 2 station STA1 wants to establish a direct link 202 with station STA. The direct link 202 allows the stations STA1 and STA2 to directly communicate with one another without involvement of the access point AP. The conventional TDLS is a three-way handshake process using an access point AP as an intermediary. This process is as follows. Initially station STA1 sends a TDLS Setup Request 204 to station STA2 via the access point AP. More specifically, the station STA1 sends the TDLS Setup Request 204 to the access point AP which, in turn, forwards the TDLS Setup Request in the form of a forwarded TDLS Setup Request 206 to the station STA2.

Once the station STA2 receives the forwarded TDLS Setup Request 206 from the access point AP, the station STA2 responds to the forwarded TDLS Setup Request with a TDLS Setup Response 208. The access point AP receives the TDLS Setup Response 208 and forwards the Setup Response 208 in the form of a forwarded Setup Response 210 the station STA1. In response to the forwarded Setup Response 210, the station STA1 communicates a Setup Confirm 212 to the access point AP which, in turn, sends a forwarded Setup Confirm 214 to the station STA2. When the station STA2 successfully receives the forwarded Setup Confirm 214, the direct link 202 between stations STA1 and STA2 is successfully established. The stations STA1 and STA2 thereafter communicate directly with each other via the direct link 202. Once the need for the direct link 202 no longer exists, such as when station STA1 has no required data to be transferred to or from station STA2, the direct link 202 is terminated in what is referred to as a "teardown" process, as will be appreciated by those skilled in the art.

In a WLAN, the stations STA and APs communicate with each other through frames, where a frame is a packet that includes header, body/payload, and error handling portions, as will be appreciated by those skilled in the art. There are three types of frames: 1) management frames; 2) control frames; and 3) data frames. In the following description a station STA that sends or "initiates" a frame, such as a TDLS request, may be referred to as an "initiator station," while a station that replies to a frame from another station may be referred to as a "responder station." The terms "initiator" and "responder" may also be used in the same context to more generally indicate that the initiating or responding device can be a station STA, access point AP, or PCP in different situations.

One station STA and one access point AP or PCP can do a fast session transfer (FST) from a first frequency band to a second frequency band. In addition, two stations STA can do a fast session transfer FST from a first frequency band to a second frequency band when there is TDLS direct link between them or there is no TDLS direct link between them. A station STA in the current band may become an access point AP or PCP in the new band through a fast session transfer FST. Conversely, an access point AP or PCP in the current band may become a station STA in the new band through a fast session transfer FST.

Figure 3:
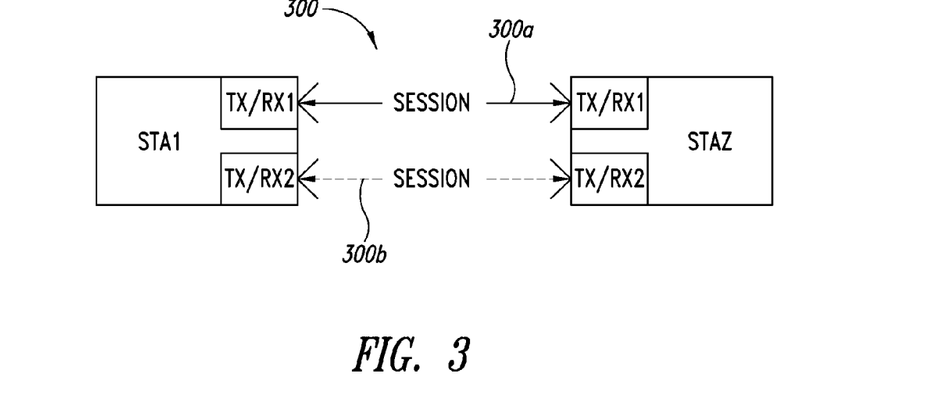
FIG. 3 is a functional block diagram illustrating a fast session transfer (FST) from a first frequency band to a second frequency band for two stations communicating through a tunneled direct link setup (TDLS) direct link.

FIG. 3 is a functional block diagram illustrating a fast session transfer (FST) from a first frequency band to a second frequency band for two stations STA1 and STA2 communicating through a link 300, as will now be explained in more detail. Each of the stations STA1 and STA2 includes two transceivers TX/RX1, TX/RX2, with each transceiver operating in a different frequency band. For example, the transceivers TX/RX1 may operate in the 2.4 or 5 GHz band while the transceivers TX/RX2 operate in the 60 GHz band. In the 2.4 or 5 GHz frequency band, station STA1 and STA2 have a TDLS direct link, meaning the link 300 is a TDLS direct link in this situation. Note that in FIG. 3 we do not show the access point AP that stations STA1 and STA2 associate with for simplification of the figure. In the 60 GHz band, stations STA1 and STA2 associate with the same PCP, which we also do not show for simplification of the figure. In the example of FIG. 3, assume that initially the link 300 is established between stations STA1 and STA2 using the transceivers TX/RX1. When the stations STA1, STA2 have established the link 300 via the TDLS process described with reference to FIG. 2 as an example, the stations are said to have established a "session." A session is state information stored in each of the pair of stations STA that can communicate with each other, where the state information includes information that describes or defines the session, as will be appreciated by those skilled in the art. This initial session between stations STA1 and STA2 is designated as session 300*a* in FIG. 3.

For a variety of different reasons, it may be advantageous for the stations STA1 and STA2 to move or transfer the current session 300*a* to the other channel or frequency band in which the stations communicate through transceivers TX/RX2. When available, such as when the stations STA1 and STA2 move closer to one another than when the session 300*a* was established, the much higher bandwidth of the 60 GHz band over which the transceivers TX/RX2 operate is advantageous to more quickly transfer desired data between the stations. Conversely, when the stations STA have a session established over the 60 GHz band and move farther apart a transfer to the 2.4 or 5 GHz and may be desirable to maintain the link 300 between the stations. This transfer of a session from one frequency band to another is known as a fast session transfer (FST), and the conventional FST process or protocol will now be described in more detail with reference to FIG. 4.

In fast session transfers FST, some reasonable changes to FIG. 3 may include that in the 2.4 and 5 GHz band stations STA1 and STA2 may communicate through an access point AP (not shown in FIG. 3) as mentioned above. Also, in the 60 GHz band one of the stations STA1 or STA2 can become the PCP so the PCP can manage the newly created PBSS in 60 GHz band. In such a case, these two devices STA1, STA2 can communicate with each other in the 60 GHz band without an additional PCP.

Figure 4:
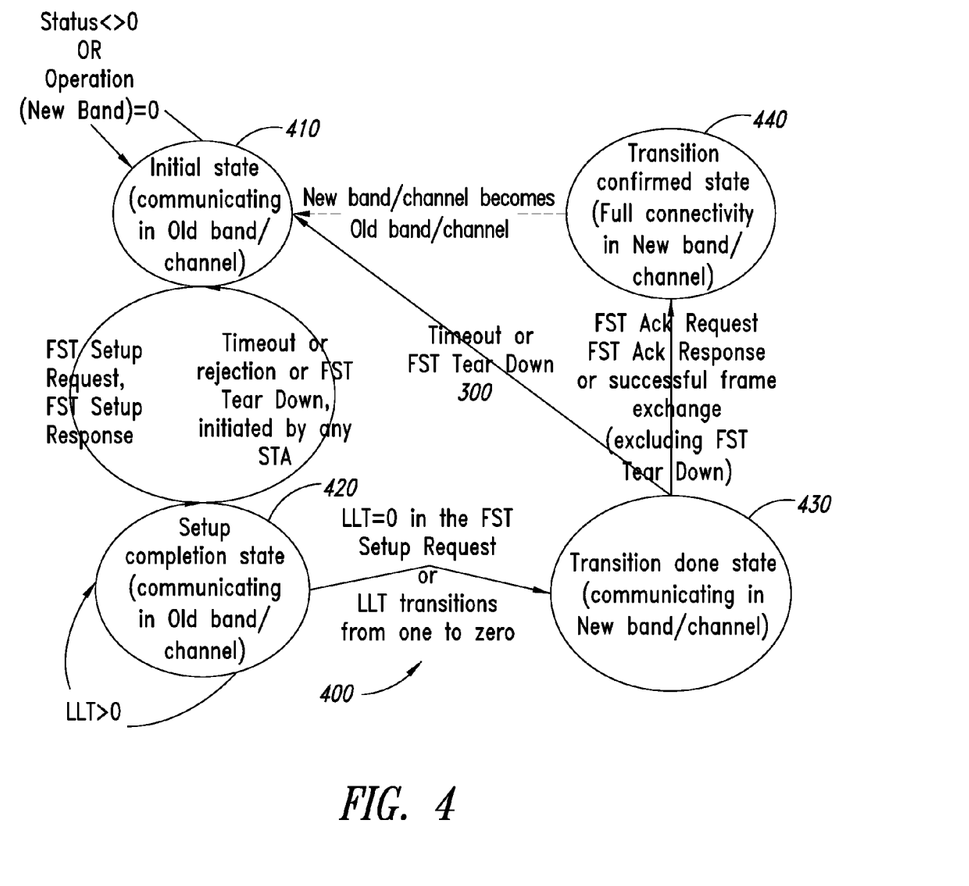
FIG. 4 is a state diagram illustrating a conventional two-stage FST protocol for transferring from one frequency band to another.

FIG. 4 is a state diagram illustrating a conventional two-stage fast session transition (FST) protocol for transferring from one frequency band to another. In the first stage of the two-stage FST protocol, the initiator station STA sends a FST Setup Request and the responder station responds with a FST Setup Response, with both these requests being communicated in the current band to thereby "negotiate" operating parameters for the new frequency band. In the second stage of the two-stage FST protocol, a FST Acknowledgement (ACK) Request from the initiator station STA and a FST ACK Response from the responder station are then transmitted in the new band to thereby establish a new session and allow communication between the two stations in the new band. The state diagram of FIG. 4 illustrates this operation.

Referring to FIG. 4, in an initial state 410 two stations STA communicate with each other via a link. In a setup completion state 420 both the initiator and responder stations STA are ready to change the frequency band from that in which the stations are currently operating. In a transition done state 430 both initiator and responder stations STA operate in the other frequency band if the value of a link loss timeout (LLT) field contained in the FST Setup Request frame used to setup the FST session is equal to zero. A fourth state is a transition confirmed state 440 that is reached when both initiator and responder stations STA have successfully communicated in the new frequency band.

The FST procedure defined in FIG. 4 has some issues that need to be solved as will become clear in the following description. Briefly, the new band operation definition is missing, the access point AP cannot forward FST Setup frames since they are management frames and the IEEE 802.11 standards do not support forwarding of management frames by access points, and fast session transfer FST security can be optimized. So there are reasonable changes that may be made to the fast session transfer FST diagram and the related protocol of FIG. 4, as will be appreciated by those skilled in the art.

In the conventional FST approach, the negotiated operating parameters in the FST Setup Request and FST Setup Response are just a new band identifier, a new band channel, new band media access control (MAC) addresses, a new band BSSID, a new band beacon interval, a new band STA role (AP, STA, PCP, etc.), new band security cipher suite, and so on that are contained in a Multi-band element in the Setup Request and Setup Response. The MAC address is a unique identifier assigned to each network interface of a station STA, access point AP, or PCP, where a network interface is the interface through which the station, access point, or PCP communicates in a given frequency band. A multiband station STA, for example, has multiple network interfaces, each network interface typically having a different associated MAC address. The BSSID is an identification associated with a particular BSS (i.e., WLAN having a BSS topology). Channels are allocations of the bandwidth in the corresponding 2.4 GHz, 5 GHz, or 60 GHz frequency band, as will be appreciated by those skilled in the art. Such negotiated operating parameters are not enough for the new band operation. For example, if the current band is the 60 GHz band and a new band is the 5 GHz band, two stations STA that support quality of service (QoS) do not know what enhanced distributed channel access (EDCA) parameters should be used in the new band. Recall, if the two stations STA involved in the fast session transfer FST are also HT stations (i.e., stations that support HT communications) in the new band, then the current FST protocol does not define the HT related operation in the new band (e.g., the primary 20 MHz channel, basic HT modulation and coding scheme (MCS) information, and so on). If the two stations STA are also very-high throughput (VHT) stations STA in the new band, the VHT related operation in the new band is also not defined through the conventional FST protocol. For example, the basic VHT MCS information, the new band channel bandwidth, and so on are not defined through the conventional FST protocol.

One embodiment of the present invention supports EDCA, HT and VHT operation in the new band of operation by including the EDCA parameter, HT Operation element, and VHT Operation element in the FST Setup Request frame. Furthermore, VHT operation also has a new power saving feature which needs association identifier (AID) information for the target station STA. As a result, the AID field information is also be added to FST Setup Request frame and FST Setup Response frame in one embodiment of the present invention. The term "capabilities information" is used herein to refer parameters associated with the functional capabilities of a station STA, access point AP, and PCP, such as the EDCA, HT, and VHT parameters. The term "operational information" is used herein in relation to these same parameters once values for the parameters have been selected for operation in a new frequency band.

In the conventional FST approach, the new band operation is defined in FST Setup Request frame sent by FST initiator station STA, access point AP, or PCP. Before doing FST Setup, the initiator STA/AP/PCP may not know the responder's (i.e., responder STA/AP/PCP) HT capability, VHT capability, the responder's channel bandwidth capability, and so on. There is a chance that the responder does not support the new band operation defined in FST Setup Request frame sent by the FST initiator. There are two possible solutions to solve this problem. The first solution is as follows. If the FST responder does not support the operation defined in FST Setup Request, the responder can reject the FST Setup Request by sending a FST Setup Response indicating that the related operation is not supported by the responder. In the FST Setup Response, the FST responder will then include its capability information. Upon receipt of this capability information from the FST responder, the FST initiator can then send another FST Setup Request with changed operation parameters that are within the FST responder's capabilities.

Figure 6:
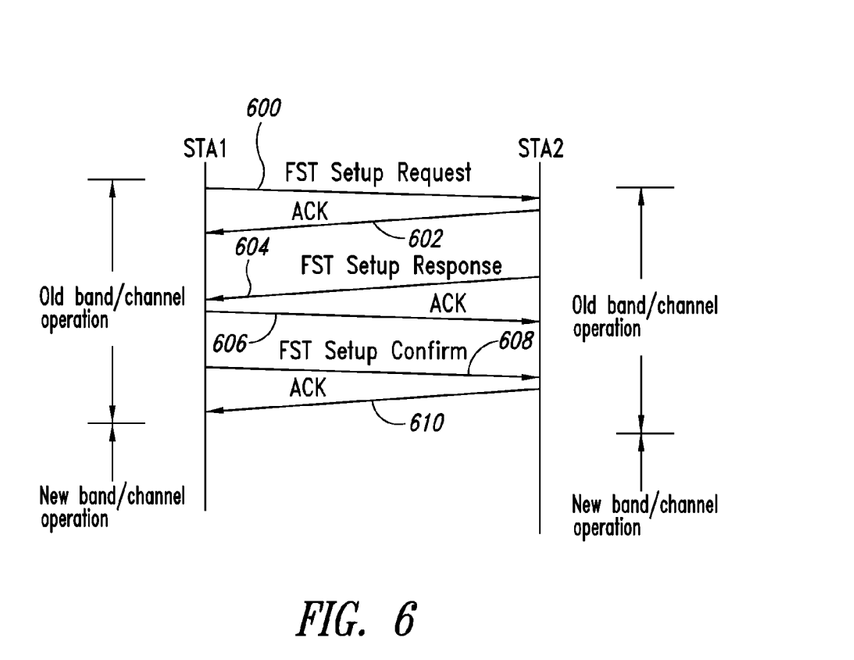
FIG. 6 is a frame communication diagram showing the inclusion of a FST Setup Confirm frame in the FST protocol according to one embodiment of the present invention.

The second solution to the problem of the responder not supporting the new band operation as defined in the FST Setup Request sent by the FST initiator is to remove the new band operation from FST Setup Request and to add a FST Setup Confirm to the FST protocol, as illustrated in FIG. 6. In this embodiment, the FST initiator STA1 sends a FST Setup Request 600 to the FST responder that includes the capability information for the initiator. The FST responder STA2 acknowledges receipt of the FST Setup Request 600 through an acknowledgement ACK frame 602 and thereafter the FST responder STA2 sends a FST Setup Response 604 that includes the capability information of the responder STA2. Upon receipt of the FST Setup Response 604, the FST initiator STA1 acknowledges receipt via an acknowledgement frame ACK 606 and the FST initiator then sends a FST Setup Confirm 608 with the new band operation that can be supported by the FST responder STA2. The FST responder STA2 then acknowledges receipt of this FST Setup Confirm 608 through an acknowledgement frame ACK 610. In this solution, the FST Setup Request does not include the new band operation information (e.g. EDCA parameter, HT Operation, VHT Operation) because the FST Setup Confirm 608 will include this information.

In a DBand operation, a PCP can broadcast the capabilities of the associated stations STAs through an Announce frame, as will be appreciated by those skilled in the art. A station STA can use an Information Request to request the capabilities of other stations STA from the PCP. A PCP uses an Information Response, which is sent in response to an Information Request frame, to transmit the capabilities of the requested stations STA. If the current operating band is DBand, a station STA can determine another stations multi-band operation through the sequence of an Announce frame, Information Request frame, and an Information Response frame.

In OBand operation, management frames such as the Announce, Information Request, and Information Response frames just discussed do not exist. Moreover, Probe Request/Response frames cannot be used in this situation without changing such frames since only an access point AP or a non-AP STA (i.e., station that is not and access point) in an IBSS WLAN can reply through a Probe Response after receiving a Probe Request according to the current IEEE 802.11 specification. One possible solution is a Multi-band station STA, which is a station with Multi-band capability, transmits a Probe Request frame to another station STA. If a Multi-band STA receives the Probe Request including Multi-band capabilities that Multi-band station will, in turn, respond by sending a Probe Response with Multi-band capabilities back to the initiating station. Another possible solution is that the station STA with Multi-band capability transmits a Probe Request frame to another station STA. If the other station STA is a Multi-band station and receives the Probe Request with Multi-band capabilities, then that Multi-band station will send back a Probe Request including Multi-band capabilities.

Part of the TDLS direct link set up process described with reference to FIGS. 2-4 includes a TDLS peer key (TPK) handshake process through which encryption keys are generated and utilized to secure communications over the direct link. A TDLS peer key security association (TPKSA) results from the TPK handshake process, where this security association is bidirectional between the initiator station STA and the responder station STA (stations STA1 and STA2, respectively, in FIGS. 2 and 3). The TPKSA is used to generate session keys to protect the given TDLS session being established and includes the TDLS peer key TPK and MAC addresses of both the initiator and responder stations STA, as will now be explained in more detail.

In order to maintain confidentiality of the TDLS peer key TPK, both the initiator station STA1 and responder station STA2 must establish a robust security network association (RSNA) with the access point 215 (FIG. 2) prior to executing the TPKA as part of the direct link setup. To setup or generate the TDLS peer key TPK for a given session the initiator station STA1 and responder station STA2 perform the following TPK handshake protocol:

1. TDLS pairwise master key (PMK) Handshake Message 1: The TDLS initiator station STA1 sends the TDLS responder station STA2 a station link identifier information element (IE), a RSNIE, a timeout interval IE, and a fast transfer information element (FTIE);
2. TDLS PMK Handshake Message 2: The TDLS responder station STA2 sends the TDLS initiator STA1 a link identifier IE, RSNIE, timeout interval IE, and FTIE; and
3. TDLS PMK Handshake Message 3: The TDLS initiator station STA1 sends the TDLS responder STA2 the link Identifier IE, RSNIE, timeout interval IE, and FTIE.

The TDLS PMK handshake message 1 is sent as part of the FST Setup Request the initiator station ST1 sends to the responder station STA2. The TDLS PMK handshake message 2 is part of the FST Setup Response that the responder station STA2 sends to the initiator station STA1. The TDLS handshake message 3 is part of the FST Setup Confirmation the initiator station ST1 sends to the responder station STA2.

Figure 5:
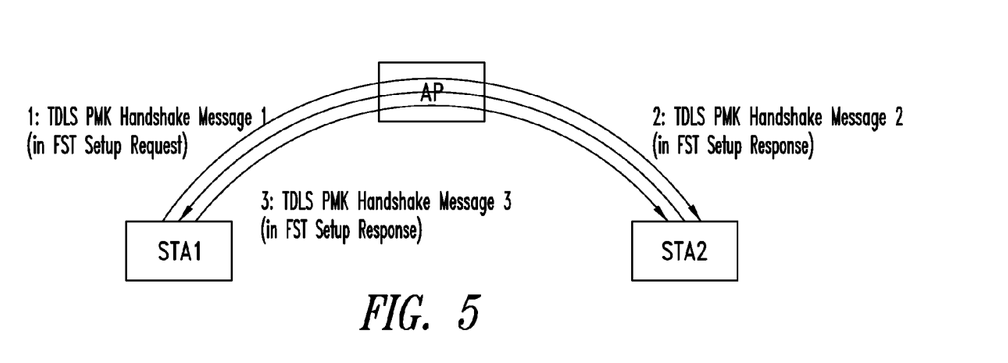
FIG. 5 is a functional flow diagram illustrating the above-described TPK handshake protocol.

The TDLS peer key TPK includes two components, a key confirmation key (KCK) component and a temporal key (TK)

component that are designated TPK-KCK and TPK-TK, respectively. The TPK-KCK is used to provide data origin authenticity in the TDLS setup response and TDLS setup confirmation while the TPK-TK is used to provide confidentiality for data being communicated over the direct link. FIG. 5 is a functional flow diagram illustrating the above-described TPK handshake protocol. When the TDLS initiator station STA1 has security enabled in its link with the access point AP, the initiator station will initiate the TDLS peer key TPK handshake protocol, meaning the initiator station will include the link identifier IE, RSNIE, timeout interval IE, and FTIE in the TDLS Setup Request.

In the current approaches, before two TDLS stations STA can securely communicate in a new band, another 4-way handshake is needed to acquire the PTKSA of the new band. When two TDLS stations STA establishing a TPK are multi-band capable stations STA, one optimization is to calculate the TDLS peer key TPK for the current band TDLS link and the pairwise transient key PTK for the new band. The solution is to include in each of the TDLS handshake messages 1-3 a multi-band element.

Normally the pairwise transient key PTK includes the key confirmation key (KCK), key encryption key (KEK), and temporal key (TK). The key confirmation key KCK is used to provide data origin authenticity in the 4-Way Handshake and Group Key Handshake messages. The key encryption key KEK is used to provide data confidentiality in the 4-Way Handshake and Group Key Handshake messages. The temporal key TK is used to encrypt data frames and ensure message integrity of data frames. Since the new band pairwise transient key PTK creation is combined with TDLS TPK creation, keys for key creation handshake authenticity and confidentiality in the new band are not required. Such protection is provided by the TDLS TPK. The only key required for the new band in the pairwise transient key PTK is the temporal key TK.

The temporal key TK in the new band is calculated by the following procedure. If both STAs have the same MAC addresses in the new band as the current band, then the temporal key TK in the new band (PTK-TK) equals to the temporal key TK in the current band (TPK-TK). If at least one of the MAC address in the new band is different from the MAC address of the current band, the same algorithm is used but in the algorithm, two new band MAC address are used to replace the current band two MAC addresses when calculating the new band temporal key TK (PTK-TK).

There is one fast session transfer FST use case in which two stations STA communicate with each other through AP forwarding in the current OBand if the two stations are in the same BSS and at least one of them does not support TDLS. The two stations STA need to exchange FST Setup frames with each other. The IEEE 802.11 specification does not allow two stations STA to exchange management frames directly. Moreover, fast session transfer FST Setup management frames and other fast session transfer FST related action frames can't be forwarded by an access point AP since management frame forwarding by an access point AP is not available in the IEEE 802.11 specification. To solve this problem, fast session transfer FST Setup management frames and other FST related action frames are encapsulated as data frames. After being encapsulated as data frames, an access point AP can forward the encapsulated fast session transfer FST Setup management frames transparently.

The two stations STA need to be able to identify the encapsulated fast session transfer FST Setup management frames. EtherType 89-0d is already used by IEEE 802.11 to encapsulate management frames in data frames, as will be understood by those skilled in the art. Briefly, "EtherType" is a two-octet field in an Ethernet frame that is used to indicate which protocol is encapsulated in the payload portion of the Ethernet Frame. As a result, a new payload type, e.g., payload type 3, is defined to identify the encapsulated fast session transfer FST related management frames.

Figure 7:
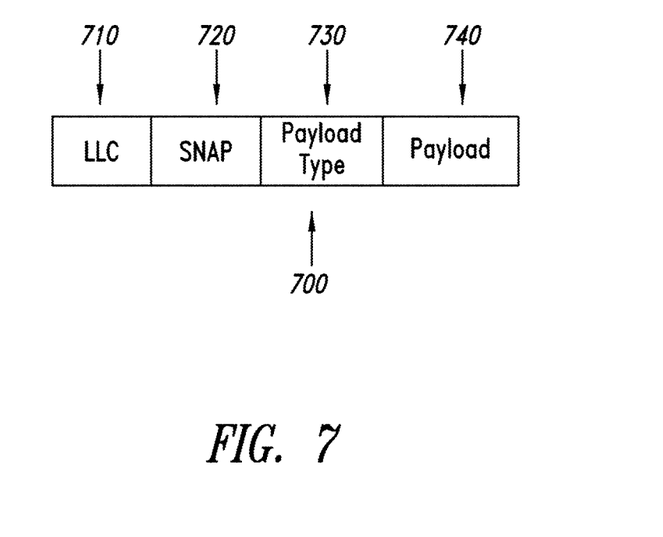
FIG. 7 illustrates FST management frame encapsulation according to one embodiment of the present invention.

FIG. 7 is a block diagram illustrating a fast session transfer FST management frame encapsulation 700, as will now be explained in more detail. The encapsulation 700 is the "frame body" portion of an IEEE 802.11 data frame, which is commonly referred to as a MAC protocol data unit (MPDU). An MPDU includes a MAC header, the frame body, and a frame check sequence (FCS) utilized for error checking, as will be understood by those skilled in the art. The fast session transfer FST management frame encapsulation 700 includes a 3-byte logical link control LLC field 710, a 5-byte Subnetwork Access Protocol SNAP field 720, where two bytes are used to indicate the Ethertype, and a 1-byte Payload Type field 730. For fast session transfer FST related management frames encapsulation, the Payload Type field 730 has the value 3. The fast session transfer FST management frame encapsulation 700 further includes a variable length payload 740 which is the encapsulated FST management frame.

One skilled in the art will understood that even though various embodiments and advantages have been set forth in the foregoing description, the above disclosure is illustrative only, and changes may be made in detail, and yet remain within the broad principles of the invention. For example, many of the components or functions described above may be implemented using either digital or analog circuitry, or a combination of both, and also, where appropriate, may be realized through software executing on suitable processing circuitry. It should also be noted that the functions performed by various components can be combined to be performed by fewer elements depending upon the actual components used in the described system. Further, illustrations of the various embodiments are intended only to further illustrate certain details of the various embodiments, and are not intended to limit the scope of the present invention to those various embodiments.

What is claimed is:

1. A method of transferring a session using a fast session transfer (FST) setup protocol, the FST setup protocol comprising:

operating a first wireless device in a current session on a current frequency band;

sending a request from the first wireless device to a second wireless device that is part of the current session, the request containing capability information including MAC address, BSSID, quality of service, high throughput, very high throughput, and security capability for a new frequency band;

receiving a response from the second wireless device that is part of the current session, the response containing capability information including MAC address, BSSID, quality of service, high throughput, very high throughput, and security capability for the new frequency band;

calculating a security key for the new frequency band using the capability information exchanged in the current band;

sending operational information from the first wireless device to the second wireless device that is part of the current session, the operational information including quality of service, high throughput, and very high throughput information for operation in a new session in the new frequency band; and wherein the first wireless device in the current band is operable to perform the method of;

sending a switching request from the first wireless device to the second wireless device that is part of the current session, the switching request including the said operation information for operation of a new session in a new frequency band;

receiving a switching response from the second wireless device, the switching response either, accepting the new session defined by the operation information in the switching request, or rejecting the new session defined by the operation information in the switching request and providing the said capability information for the second wireless device in a new frequency band; and when the new session is rejected, sending a second switching request from the first wireless device to the second wireless device containing the said operation information corresponding to that received from the second wireless device in the switching response;

receiving a second switching response from the second wireless device accepting the new session defined by the operation information in the second switching request; and establishing the new session between the first and second wireless devices in the new frequency band.

2. The method of claim 1, wherein the first wireless device in the current band uses a Probe Request and a TDLS Discovery Request to transmit the said capability information for the new band; and wherein the method includes receiving one of a Probe Request and Probe Response from the second wireless device that is part of the current session, the response including its said capabilities for the new band.

3. The method of claim 1, wherein the first wireless device in the current band uses a TDLS Discovery Request to transmit the said capabilities for the new band; and wherein the method includes receiving a TDLS Discovery Response from the second wireless device that is part of the current session, the response including its said capabilities for the new band.

4. The method of claim 1, wherein the switching request comprises a FST Setup Request frame.

5. The method of claim 4, wherein the FST Setup Request frame further includes association identifier AID information.

6. The method of claim 1, wherein the switching response comprises a FST Setup Response frame.

7. The method of claim 1, wherein in the current session one of the first and second wireless devices is a station STA and the other of the first and second wireless devices is one of an access point AP and PCP.

8. The method of claim 1, wherein in the new session one of the first and second wireless devices is a station STA and the other of the first and second wireless devices is one of an access point AP and PCP.

9. The method of claim 1, wherein each of the first and second wireless devices is a station in a frequency band and wherein the session is a TDLS direct link between the stations in the frequency band.

10. The method of claim 1, wherein calculating a security key for the new frequency band using the capability information exchanged in the current band includes TDLS TPK creation in the current band that is used to calculate the new frequency band security key and TDLS PMK handshake messages are used to calculate the security keys of current frequency band and the new frequency band.

11. The method of claim 10, wherein the new band TK is the same as the TPK TK in the current band when both the first wireless device and the secondary wireless device have the same MAC addresses in both bands.

12. The method of claim 10, wherein the new band TK is calculated using the same algorithm as the TPK TK in the current band but the MAC address parameter is replaced by the MAC address in the new band when at least one of the first wireless device and the secondary wireless device have different MAC addresses in the current and new frequency bands.

13. The method of claim 1, wherein the first frequency band is one of the OBand and DBand and the new frequency band is one of the OBand and DBand.

14. A method of transferring a session using a fast session transfer (FST) setup protocol, the FST setup protocol comprising:

operating a first wireless device in a current session on a current frequency band;

sending a request from the first wireless device to a second wireless device that is part of the current session, the request containing capability information including MAC address, BSSID, quality of service, high throughput, very high throughput, and security capability for a new frequency band;

receiving a response from the second wireless device that is part of the current session, the response containing capability information including MAC address, BSSID, quality of service, high throughput, very high throughput, and security capability for the new frequency band;

calculating a security key for the new frequency band using the capability information exchanged in the current band;

sending operational information from the first wireless device to the second wireless device that is part of the current session, the operational information including quality of service, high throughput, and very high throughput information for operation in a new session in the new frequency band; and wherein the switch request and switch response are encapsulated in the frame body of a data frame when the switch request and switch response are forwarded by one of an AP and a PCP.

15. The method of claim 14, wherein the Ethertype 89-0d is used to indicate such encapsulation.

16. A method of transferring a session using a fast session transfer (FST) setup protocol, the FST setup protocol comprising:

operating a first wireless device in a current session on a current frequency band;

sending a request from the first wireless device to a second wireless device that is part of the current session, the request containing capability information including MAC address, BSSID, quality of service, high throughput, very high throughput, and security capability for a new frequency band;

receiving a response from the second wireless device that is part of the current session, the response containing capability information including MAC address, BSSID, quality of service, high throughput, very high throughput, and security capability for the new frequency band;

calculating a security key for the new frequency band using the capability information exchanged in the current band;

sending operational information from the first wireless device to the second wireless device that is part of the current session, the operational information including quality of service, high throughput, and very high throughput information for operation in a new session in the new frequency band;

wherein the first wireless device in a current session on a first frequency band performs the method of:

sending an FST Setup Request from the first wireless device to the second wireless device that is part of the current session, the FST Setup Request including capability information for the first wireless device in a new frequency band in which a new session is to be established;

receiving an Acknowledgement indicating receipt of the FST Setup Request;

receiving a FST Setup Response containing capability information for the second wireless device;

sending an Acknowledgement indicating receipt of the FST Setup Response;

sending a FST Setup Confirm containing operation for the new session in the new frequency band to be established;

receiving an Acknowledgement indicating receipt of the FST Setup Confirm; and establishing the new session between the first and second wireless devices in the new frequency band.

17. The method of claim 16, wherein the operation information includes quality of service, high throughput, and very high throughput operation information.

18. The method of claim 16, wherein the quality of service operation information comprises enhanced distributed channel access (EDCA) parameters.

19. The method of claim 16, wherein the FST Setup Request includes no operation information about the new frequency band of the new session to be established.

20. A multiband wireless device operable in a current session on a current frequency band, the multiband wireless device operable to send a request to a second multiband wireless device that is part of the current session, the request containing capability information including MAC address, BSSID, quality of service, high throughput, very high throughput, and security capability for a new frequency band, and wherein the multiband station is further operable to receive a response from a second wireless device that is part of the current session, the response containing capability information including MAC address, BSSID, quality of service, high throughput, very high throughput, and security capability for the new frequency band, the multiband wireless device calculating a security key for the new frequency band using the capability information exchanged in the current frequency band and communicating operational information to the second wireless device, the operational information including quality of service, high throughput, and very high throughput information for operation in a new session in the new frequency band, and wherein the multiband wireless device is further operable to send a first switching request to the second multiband wireless device and to receive a first switching response from the second multiband wireless device either accepting or rejecting a new session in a new frequency band contained in the switching request, and when the switching response indicates the new session has been rejected, the multiband wireless device sends a second switching request to the second multiband wireless device including operation information corresponding to that received from the second multiband wireless device in the first switching response.

21. The wireless multiband device of claim 20 wherein the device is one of a station, access point, and PCP.

22. A WLAN, comprising:

a first multiband wireless device;

a second multiband wireless device; and wherein the first and second multiband wireless devices are operable in a current session on a current frequency band;

wherein the first multiband wireless device is operable to send a first request to the second multiband wireless device that is part of the current session, the request containing capability information including MAC address, BSSID, quality of service, high throughput, very high throughput, and security capability for operation in a new frequency band;

wherein the second multiband wireless device is operable to send a first response to the first multiband wireless device that is part of the current session, the response containing capability information including MAC address, BSSID, quality of service, high throughput, very high throughput, and security capability for the new frequency band;

wherein when the response indicates the second multiband wireless device has rejected the first request, the first multiband wireless device sends a second request to the second multiband wireless device including operation information corresponding to that received from the second wireless device in the first switching response; and wherein the first wireless multiband device is further operable to calculate a security key for the new frequency band using the capability information exchanged in the current frequency band and to communicate operational information to the second wireless multiband device, the operational information including the security key, quality of service, high throughput, and very high throughput information for operation in a new session in the new frequency band.

23. The WLAN of claim 22, wherein each of the first and second wireless multiband devices is one of a station, access point, and PCP.

* * * * *